US010306984B2

(12) United States Patent
Jones et al.

(10) Patent No.: US 10,306,984 B2
(45) Date of Patent: Jun. 4, 2019

(54) TOROIDAL SUPPORT STRUCTURES

(71) Applicant: The Boeing Company, Chicago, IL (US)

(72) Inventors: Rodney H. Jones, Huntsville, AL (US); Zachary S. Hopkins, Madison, AL (US); Murray S. Edmondson, Madison, AL (US); James B. Weathers, Madison, AL (US); Shawn E. Mills, Owens Cross Roads, AL (US)

(73) Assignee: The Boeing Company, Chicago, IL (US)

( * ) Notice: Subject to any disclaimer, the term of this patent is extended or adjusted under 35 U.S.C. 154(b) by 107 days.

(21) Appl. No.: 15/384,660

(22) Filed: Dec. 20, 2016

(65) Prior Publication Data
US 2018/0055227 A1 Mar. 1, 2018

Related U.S. Application Data

(60) Provisional application No. 62/381,527, filed on Aug. 30, 2016.

(51) Int. Cl.
B64G 1/22 (2006.01)
A47B 95/00 (2006.01)
(Continued)

(52) U.S. Cl.
CPC ............... A47B 95/00 (2013.01); B64G 1/22 (2013.01); B64G 1/402 (2013.01); B64G 1/64 (2013.01)

(58) Field of Classification Search
CPC .......... A47B 95/00; B64G 1/22; B64G 1/402; B64G 1/64; B64G 1/228; B65D 25/24;
(Continued)

(56) References Cited

U.S. PATENT DOCUMENTS 1,885,601 A * 11/1932 Horton ................... B65D 90/12
220/565
2,363,992 A * 11/1944 Reiser ................... B65D 90/12
220/565
(Continued)

OTHER PUBLICATIONS

"European Application Serial No. 17188308.5, Search Report dated Jan. 22, 2018", 10 pgs.

Primary Examiner — Ingrid M Weinhold
(74) Attorney, Agent, or Firm — Kwan & Olynick LLP

(57) ABSTRACT

Provided are toroidal support structures and assemblies comprising these structures. A toroidal support structure comprises one or more side panels forming a tubular ring and one or more floor panels forming a planar ring. These rings define the toroidal shape of the structure. The structure also comprises multiple isolating linear support components connected to a top edge of the tubular ring. During installation of the structure, the isolating linear support components are attached to a mounting base for supporting the structure relative to the base, while providing thermal isolation to the rings and preventing their mechanical distortion. As such, a toroidal support structure can be attached to various types of mounting bases, such as a cryogenic tank of a spacecraft. Both rings provide supporting and mounting surfaces for equipment, cables, and pipes, while the toroidal opening allows external components to protrude through the support structure.

16 Claims, 7 Drawing Sheets

(51) Int. Cl.
*B64G 1/40* (2006.01)
*B64G 1/64* (2006.01)

(58) Field of Classification Search
CPC .. B65D 88/04; B65D 90/02; F17C 2201/0133
USPC ............ 248/213.2, 588–589, 591, 581, 595,
248/603–604, 610–614, 618–619, 678,
248/346.01, 346.03, 346.06, 146; 52/247,
52/167.4, 73, 82; 220/9.1, 9.4, 566, 565,
220/631, 636, 638, 628
See application file for complete search history.

(56) References Cited

U.S. PATENT DOCUMENTS

| | | | | |
|---|---|---|---|---|
| 2,366,337 A * | 1/1945 | Kreuter | ................... | B25H 1/00 217/36 |
| 2,417,053 A * | 3/1947 | Boardman | ............ | B65D 90/12 220/565 |
| 2,440,449 A * | 4/1948 | Raemer | ............... | E04B 1/34315 52/155 |
| 2,731,334 A * | 1/1956 | Wissmiller | ............... | E04H 7/14 220/567 |
| 3,115,983 A * | 12/1963 | Wissmiller | ............. | B65D 90/12 220/560.09 |
| 3,152,713 A * | 10/1964 | Clifford | ................. | B65D 90/12 220/560.05 |
| 3,592,422 A * | 7/1971 | Paine | .................... | F16F 15/067 244/173.2 |
| 3,595,508 A * | 7/1971 | Knight | ................. | B65D 88/128 296/15 |
| 3,792,795 A * | 2/1974 | Sikora | .................. | B65D 90/143 220/565 |
| 4,004,429 A * | 1/1977 | Mouton, Jr. | ............ | E02D 29/00 405/188 |
| 4,197,548 A * | 4/1980 | Smith | ...................... | H01Q 1/18 343/757 |
| 5,117,402 A * | 5/1992 | Myers | ...................... | B63G 8/42 248/676 |
| 5,169,094 A | 12/1992 | Maute et al. | | |
| 5,538,373 A * | 7/1996 | Kirkham | .............. | B23Q 1/5462 248/562 |
| 5,568,993 A * | 10/1996 | Potzick | ................ | B23Q 1/5462 403/128 |
| 5,870,834 A * | 2/1999 | Sheldon | ................. | G01B 5/004 33/502 |
| 6,028,570 A * | 2/2000 | Gilger | ..................... | H01Q 1/288 343/880 |
| 6,041,500 A * | 3/2000 | Terpstra | ................ | B23P 15/006 29/23.51 |
| 6,116,552 A * | 9/2000 | Johnson | ................ | A01C 15/006 248/146 |
| 6,158,693 A * | 12/2000 | Mueller | ................. | B64D 17/78 244/158.9 |
| 6,196,081 B1 * | 3/2001 | Yau | ..................... | B23Q 1/5462 248/651 |
| 6,671,975 B2 * | 1/2004 | Hennessey | ................. | B25J 7/00 33/533 |
| 7,231,785 B2 * | 6/2007 | Wilhelm | .............. | F25J 3/04945 62/617 |
| 7,246,469 B2 * | 7/2007 | Back | ......................... | E04B 7/04 52/640 |
| 7,515,359 B2 * | 4/2009 | Kugler | ................... | G02B 7/023 359/811 |
| 7,686,255 B2 * | 3/2010 | Harris | .................... | B64G 1/222 244/159.4 |
| 7,798,465 B1 * | 9/2010 | Meverden | ............... | F24F 13/32 248/153 |
| 7,841,097 B2 * | 11/2010 | Evans | .................. | B25J 17/0216 33/502 |
| 7,950,633 B2 * | 5/2011 | Hiley | ...................... | F16F 15/02 188/380 |
| 7,963,084 B2 * | 6/2011 | Merrifield | ............. | E04B 1/3441 52/117 |
| 8,214,080 B2 * | 7/2012 | Petterson | ............... | B23Q 1/5462 33/502 |
| 8,333,766 B2 * | 12/2012 | Edelhauser | ............ | A61B 17/62 606/55 |
| 8,371,088 B2 * | 2/2013 | Merrifield | ................ | B64G 1/22 52/109 |
| 8,864,763 B2 * | 10/2014 | Murray | .................. | A61B 17/66 606/56 |
| 8,956,068 B2 * | 2/2015 | Mekid | .................... | F16M 11/043 248/176.1 |
| 8,960,600 B2 * | 2/2015 | Carreker | ................. | B64G 1/22 244/100 R |
| 9,205,566 B2 * | 12/2015 | Schwab | ............... | B23Q 1/5462 |
| 9,234,351 B1 * | 1/2016 | Echelman | ................ | E04C 5/00 |
| 9,599,274 B2 * | 3/2017 | Bullard | ................. | F16M 11/00 |
| RE46,531 E * | 9/2017 | Oren | ....................... | D23/202 |
| 9,842,509 B2 * | 12/2017 | Van Lookeren Campagne | .......... | G09B 9/12 |
| 10,010,350 B2 * | 7/2018 | Mannanal | ............... | A61B 17/62 |
| 2004/0074922 A1 * | 4/2004 | Bothor | ................ | B65B 69/0075 222/105 |
| 2007/0044415 A1 * | 3/2007 | Merrifield | ............... | E04B 1/3441 52/633 |
| 2008/0007736 A1 * | 1/2008 | Kammer | ................ | G01C 11/00 356/606 |
| 2008/0290221 A1 * | 11/2008 | Dupuis | .................. | B64G 1/222 244/172.6 |
| 2010/0032876 A1 * | 2/2010 | Hiley | ....................... | F16F 15/02 267/140.5 |
| 2010/0154321 A1 * | 6/2010 | Javierre Lardies | ....... | E04C 3/34 52/82 |
| 2010/0269446 A1 * | 10/2010 | Merrifield | ................ | B64G 1/22 52/646 |
| 2010/0305568 A1 * | 12/2010 | Ross | ...................... | A61B 17/62 606/56 |
| 2011/0056074 A1 * | 3/2011 | Jonas | .................... | B23K 1/0016 29/829 |
| 2011/0118738 A1 * | 5/2011 | Vasta | ..................... | A61B 17/62 606/56 |
| 2011/0226929 A1 * | 9/2011 | Hiley | ...................... | F16F 15/02 248/562 |
| 2012/0234980 A1 | 9/2012 | Leventhal | | |
| 2012/0286123 A1 * | 11/2012 | Schwab | ............... | B23Q 1/5462 248/346.06 |
| 2014/0117163 A1 * | 5/2014 | Simpson | ................. | B64D 37/06 244/135 R |
| 2014/0191922 A1 * | 7/2014 | Kato | ........................ | H01Q 1/12 343/872 |
| 2015/0360791 A1 | 12/2015 | Chevrollier et al. | | |
| 2015/0376857 A1 * | 12/2015 | Clifton | .................... | E02D 27/42 52/292 |
| 2016/0053941 A1 | 2/2016 | Rebernik | | |
| 2016/0230365 A1 * | 8/2016 | Shi | .......................... | E02D 27/42 |
| 2017/0030444 A1 * | 2/2017 | Kurose | ................. | F16H 25/183 |

* cited by examiner

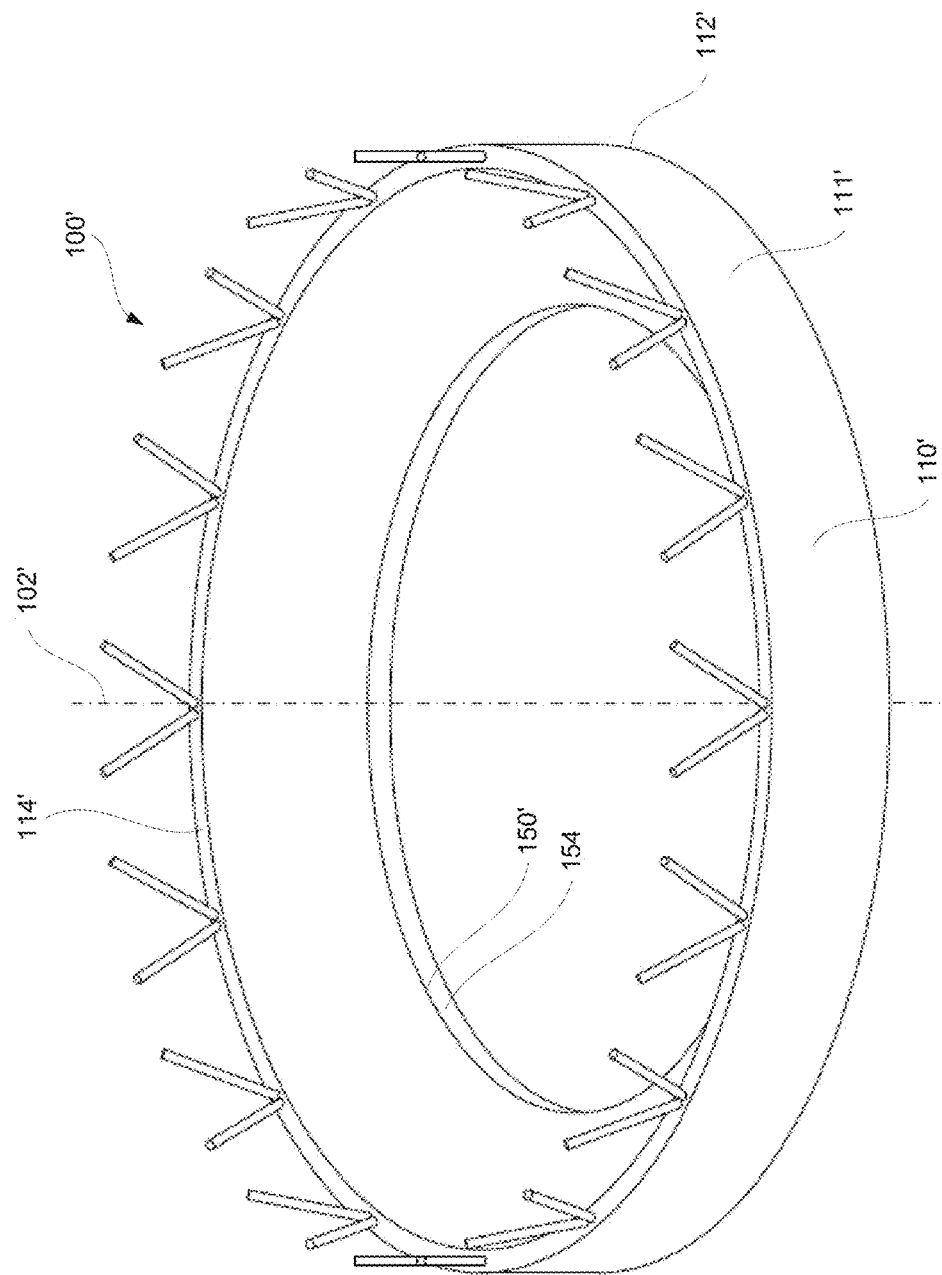

TOROIDAL SUPPORT STRUCTURES

CROSS-REFERENCE TO RELATED APPLICATIONS

This application claims the benefit under 35 U.S.C. § 119(e) of U.S. Provisional Patent Application No. 62/381,527, entitled: "TOROID CONFIGURATION FOR SUSPENDED SHELF DESIGNS" filed on 30 Aug. 2016, which is incorporated herein by reference in its entirety for all purposes.

GOVERNMENT LICENSE RIGHTS

This invention was made with government support under NNM07AB03C awarded by The National Aeronautics and Space Administration (NASA). The government has certain rights in the invention.

BACKGROUND

Support structures, such as shelves, may be used on spacecraft and other applications for supporting various components. Depending on applications, support structures may need to have low mass, high strength, ability withstand shock and vibration, support different components while providing access to these component, and/or fit within their operating environments. Fitting support structures inside and/or around circular objects can be challenging. For example, space available between a cylinder (e.g., an interior wall of a spacecraft) and a sphere (e.g., a cryogenic tank) inserted into the cylinder has a complex geometry and often is underutilized. Furthermore, support structures may need to operate in environments with rapidly changing temperatures, such as being supported by a cryogenic tank. Temperature fluctuations may cause different levels of thermal expansions and/or contractions on different components of support structures causing deformations and misalignment.

SUMMARY

Provided are toroidal support structures and assemblies comprising these structures. A toroidal support structure comprises one or more side panels forming a tubular ring and one or more floor panels forming a planar ring. These rings define the toroidal shape of the structure. The structure also comprises multiple isolating linear support components connected to a top edge of the tubular ring. During installation of the structure, the isolating linear support components are attached to a mounting base for supporting the structure relative to the base, while providing thermal isolation to the rings and preventing their mechanical distortion. As such, a toroidal support structure can be attached to various types of mounting bases, such as a cryogenic tank of a spacecraft. Both rings provide supporting and mounting surfaces for equipment, cables, and pipes, while the toroidal opening allows external components to protrude through the support structure.

In some embodiments, a toroidal support structure comprises one or more side panels forming a tubular ring. The tubular ring extends between a first edge and a second edge. The toroidal support structure also comprises one or more floor panels forming a planar ring. The planar ring extends between an outer edge and an inner edge. The first edge of the one or more side panels is fixed to the outer edge of the one or more floor panels. This feature preserves orientation of the one or more side panels relative to the one or more floor panels. The toroidal support structure also comprises a plurality of isolating linear support components connected to the second edge of the one or more side panels at connection members. The connection members are evenly distributed along the second edge. Furthermore, the connection members are equally spaced from the center axis of the toroidal support structure. The spacing between each of the connection members and the center axis may be referred to as a radius of the tubular ring.

In some embodiments, multiple isolating linear support components are connected to the second edge at each of the connection members. This feature may be used to provide circumferential support to the one or more side panels and, as a result, to the entire toroidal support structure. In other words, this feature may prevent the toroidal support structure from rotating relative to a mounting base when the isolating linear support components are attached to the mounting base during installation of the toroidal support structure.

In some embodiments, when the toroidal support structure is installed and the isolating linear support components are attached to the mounting base, the angle between each isolating linear support component and the radius extending to the connection member associated with this isolating linear support component may be the same. In some embodiments, all radii may be perpendicular to the tubular ring.

In some embodiments, each isolating linear support component is pivotably connected to the second edge at one of the connection members. The pivotable connection allows to pivot the isolating linear support component relative to the second edge during installation of the toroidal support structure to a mounting base. The pivotable connection also allows to install the toroidal support structure to different types of mounting bases, e.g., mounting bases having different sizes. Furthermore, the pivotable connection may allow to reduce stress concentrations at the connection members and/or torque transfer between the isolating linear support components and the second edge during operation of the toroidal support structure.

In some embodiments, the toroidal support structure further comprises a plurality of connectors for connecting the toroidal support structure to a mounting base. Specifically, the connector may directly interface the mounting base and may be bolted, welded, or otherwise attached to the mounting base. The connectors are attached to the ends of the isolating linear support components that are opposite to the ends connected to the second edge. In some embodiments, each connector may be pivotably connected to a different isolating linear support component. The pivotable connection allows to pivot the connectors relative to the isolating linear support component during installation of the toroidal support structure to a mounting base. Furthermore, the pivotable connection may allow to reduce stress concentrations and/or torque transfer between the isolating linear support components and the connectors during operation of the toroidal support structure.

In some embodiments, the length of each isolating linear support component is the same. This feature allows for the second edge to be parallel to the mounting base after installation of the toroidal support structure. Furthermore, when the isolating linear support components expand or contract due to thermal fluctuations of the mounting base, the second edge may remain parallel to the mounting base.

In some embodiments, the one or more side panels comprise multiple side panels connected along vertical edges into the tubular ring. Each of the connection members may be positioned at a different vertical edge.

In some embodiments, each of the multiple side panels may be a planar structure. As such, the tubular ring may be a polygon prism. Furthermore, the inner edge of the planar ring may have a polygon shape. The outer edge of the planar ring may have has a polygon shape. Alternatively, the tubular ring may be a cylinder. For example, a single side panel may be used to form the tubular ring. In another example, multiple curved side panels may be used such that these panels have the same radius and form a cylindrical tubular ring without any edges.

In some embodiments, the one or more side panels comprise grid stiffeners. The grid stiffeners enhance stiffness of the panels without excessive weight. The one or more side panels may have openings. The one or more floor panels may have a honeycomb sandwich structure and may also include openings.

In some embodiments, the toroidal support structure further comprises one or more interior supports. The one or more interior supports may be connected to the one or more side panels and to the one or more floor panels and maintain the orientation of the one or more side panels relative to the one or more floor panels. More specifically, the angle between the one or more side panels and the one or more floor panels along the second edge may be maintained. In some embodiments, this angle may be about 90°.

The one or more interior supports may comprise a plurality of struts connected to the second edge of the one or more side panels. This plurality of struts may be also connected at the connection members together with the isolating linear support components. In some embodiments, multiple struts are connected to the second edge at each connection member. Furthermore, the plurality of struts may be pivotably connected to the second edge at connection members.

In some embodiments, the one or more interior supports comprise one or more interior panels. At least one side panels may be pivotable relative to the one or more floor panels or relatively to the one or more side panels for access to an enclosure of the toroidal support structure. The enclosure is defined by the one or more interior panels, the one or more side panels, and the one or more floor panels. In some embodiments, the one or more interior panels form a torpid ring.

Also provided is an assembly comprising a toroidal support structure and a mounting base. The toroidal support structure comprises one or more side panels, one or more floor panels, and a plurality of isolating linear support components. The one or more side panels form a tubular ring extending between a first edge and a second edge. The one or more floor panels form a planar ring extending between an outer edge and an inner edge. The first edge of the one or more side panels is fixed to the outer edge of the one or more floor panels. The plurality of isolating linear support components is connected to the second edge of the one or more side panels at connection members. The connection members are evenly distributed along the second edge and equally spaced from a center axis of the toroidal support structure by a radius. The plurality of isolating linear support components is connected to the mounting base.

In some embodiments, the angle between each one of the plurality of isolating linear support components and the radius extending to one of the connection members associated with the one of the plurality of isolating linear support components is the same.

The mounting base may be a cryogenic tank having a dome shape. The toroidal support structure surrounds the mounting base such that a portion of the mounting base at least partially protrudes into the tubular ring. In some embodiments, a portion of the mounting base at least partially protrudes into the planar ring.

In some embodiments, the assembly further comprises at least one of wiring or tubing supported by the one or more floor panels. The assembly may further comprise an equipment component selected from the group consisting of a thruster and a camera, wherein the equipment component is mounted to the one or more side panels externally to the tubular ring.

These and other embodiments are described further below with reference to the figures.

BRIEF DESCRIPTION OF THE DRAWINGS

FIG. 2A is a schematic perspective view of a toroidal support structure having an interior panel, in accordance with some embodiments.

DETAILED DESCRIPTION

Figure 1A:
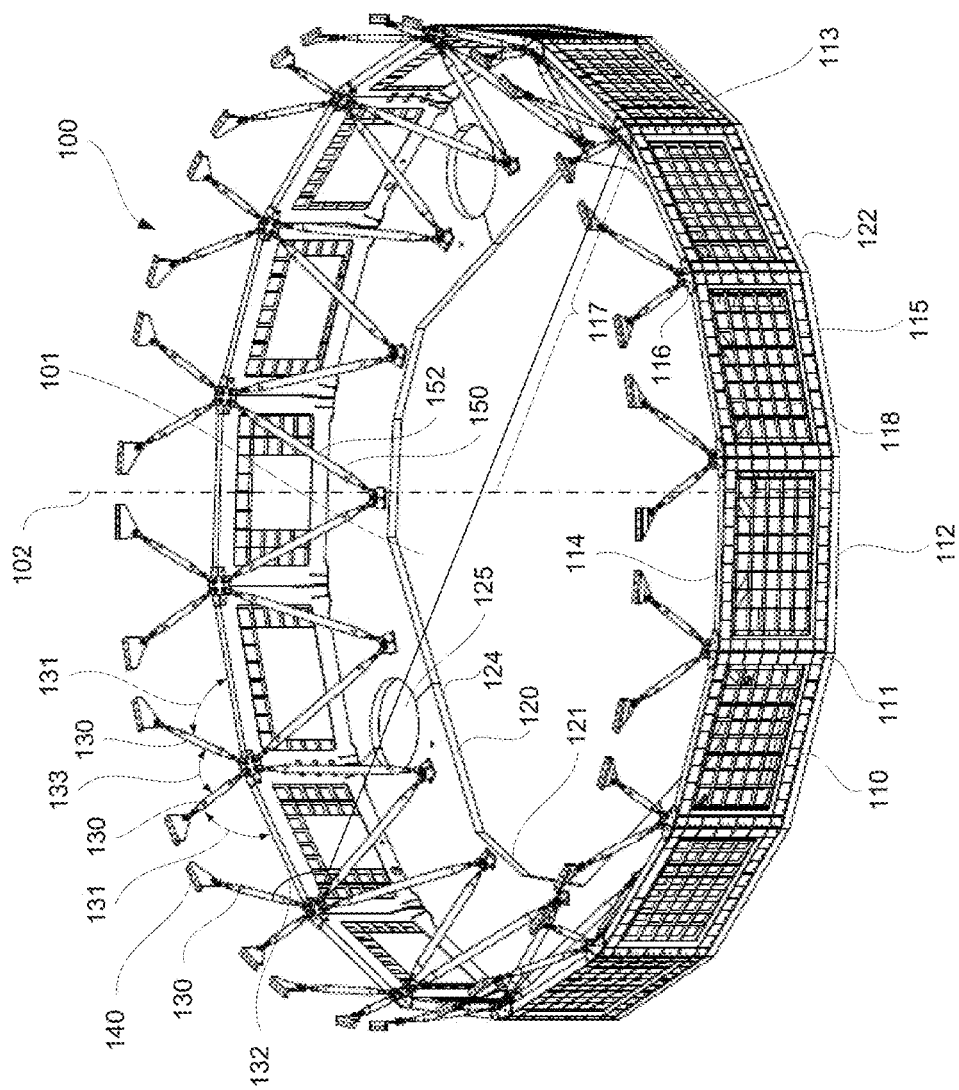
FIG. 1A is a schematic perspective view of a toroidal support structure, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Most conventional support structures (e.g., shelves) are typically planar structures extending along one direction and typically supported by or attached to planar mounting bases (e.g., walls). However, specific applications of support structures may demand fitting these structures within specific spaces (e.g., between a cylindrical outer boundary and a spherical outer boundary). Furthermore, the structures may need to withstand vibration (e.g., short terms accelerations of up to 10 g) while supporting substantial loads. In some embodiments, the structure may operate around components prone to high temperature fluctuations. One specific application is supporting various equipment components, piping, and wiring within a spacecraft in area between the cylindrical outer shell of the spacecraft and its spherical cryogenic tank. The cryogenic tank may also be used as a mounting base for the structure. The available space in that area is a toroid. The cross-section of this toroid may have a righttriangle-like shape in which the hypotenuse is replaced by a curved representing a portion of a circle. While a planar shelf may be positioned at the widest portion of this available space (e.g., along the bottom), the planar shelf does not provide an adequate surface for mounting equipment. Furthermore, supporting the planar shelf in this space can be challenging. Supporting struts will need to have different lengths and extend to both outer and inner edges of the planar shelf. Longer struts will experience greater levels of thermal deformations during temperature fluctuations causing misalignment and even deformation of the planar shelf.

Provided are toroidal support structures and assemblies comprising these toroidal support structures. These toroidal support structures address various issues associated with planar shelves describes above. Toroidal support structures may be configured to fit into any available toroidal-shaped spaces and may require minimal support. The design of toroidal support structures establishes stiffness of the structures regardless of the support.

A toroidal support structure comprises one or more side panels forming a tubular ring. Furthermore, the toroidal support structure comprises one or more floor panels forming a planar ring. These rings are connected along their edges, e.g., a bottom (first) edge of the tubular ring and the outer edge of the planar ring. The top (second) edge of the tubular ring is connected to isolating linear support components used for supporting both rings relative to a mounting base, such as a cryogenic tank. The isolating linear support components are all connected to the same edge of the tubular ring and may have the same length. As such, thermal fluctuations of the mounting base will not interfere with the orientation of the rings. The rings may still move up and down relative to the mounting base due to thermal expansion/contraction of the isolating linear support components. However, this movement may be in the direction perpendicular to the mounting base and to the planar ring. Furthermore, because the thermal conduction of the isolating linear support components is minimal, the thermal fluctuations of the mounting base do not cause any significant thermal fluctuations of the rings of the toroidal support structure.

Both rings of the toroidal support structure provide supporting and mounting surfaces for equipment, cables, pipes, and other like components. Furthermore, these surfaces may be also used for thermal coupling of the mounted components to provide thermal management, such as heat dissipation from electronic components during their operation. In some embodiments, both sides of one or both rings may be used for support thereby increasing the overall available surface of the toroidal support structure. Furthermore, a toroidal support structure may include one or more interior panels forming an interior ring. The interior ring may, in turn, form an enclosure with the tubular ring and the planar ring. The enclosure may be used to protect various internally mounted components from the environment. The access to the enclosure may be, for example, through a pivotable portion of one of the rings.

In some embodiments, a center opening of the toroidal support structure may be used to protrude other components, such as a portion of the mounting base. The toroidal design of the support structure allows mounting this structure over other components. The rings of the toroidal support structure may be specifically designed to fit these protruding components. For example, the interior panels may be curved inwards (relative to a straight line connecting the second edge of the tubular ring and the inner edge of the planar ring) to fit around spherical objects.

The toroidal design of the support structure has a higher stiffness than, for example, a conventional planar shelf. The improved stiffness translates into ability to support higher loads, withstand higher accelerations (e.g., vibrations), and produce improved stability. In some embodiments, the one or more side, the one or more floor panels, and the one or more interior supports (e.g., interior panels or struts) may form a closed shape. The closed shape has a higher bending and torsion stiffness than, for example, conventional planar designs. It should be noted that the interior panels may be used in addition to or instead of interior struts, which may be collectively referred to as interior supports.

The toroidal design may also result in a lower mass of the toroidal support structure in comparison to a conventional planar shelf. Because of the much higher stiffness of the toroidal shape, lighter materials may be used, for example, for side panels and/or floor panels. For example, floor panels may have a honeycomb sandwich structure.

Side panels and, in some embodiments, interior panels may be planar panels or curved panels. For example, when interior panels are planar, the tubular ring has a polygon prism shape. When one or more interior panels are curved, the curvature of these panels may correspond to the radius of the surrounding interior. The curvature may be specifically selected to ensure continuity of the surface and to avoid sharp edges. In some embodiments, the tubular ring has a round cylinder shape.

Toroidal support structures described herein may be used for spacecraft and other applications. While the focus of this description is on spacecraft and, specifically, on mounting toroidal support structures around cryogenic tanks of spacecraft, one having ordinary skills in the art would understand that other applications are within the scope. Toroidal support structures can be used to fit into any cylindrical interiors and various round objects may protrude through center openings of toroidal support structures.

Examples of Toroidal Support Structures

FIG. 1A is a schematic perspective view of toroidal support structure 100, in accordance with some embodiments. Toroidal support structure 100 may be used for supporting equipment, piping, and wiring in a spacecraft, as further described below with reference to FIG. 4. Toroidal support structure 100 is designed to withstand and provide mechanical support to other components during short-terms accelerations of up to 10 g and long-term accelerations up to 3 g, which are common during operation of spacecraft. In addition to mechanical support, toroidal support structure 100 provides thermal isolation of supported components and structure's components thereby allowing using mounting bases that operate at extreme temperatures. For example, a cryogenic tank of a spacecraft may be used as a mounting base. Specifically, toroidal support structure 100 may be suspected from the cryogenic tank, which may undergo temperature fluctuations of between about +25° C. and −182° C. during some operations. One having ordinary skills in the art would understand that toroidal support structure 100 may also be used for other applications In some embodiments, toroidal support structure 100 comprises one or more side panels 110 forming tubular ring 111. Tubular ring 111 extends between first edge 112 and second edge 114. Tubular ring 111 may have a cylindrical shape, such that one or more side panels 110 are parallel to center axis 102. In this example, first edge 112 and second edge 114 have the same shape and size. The cylindrical shape of tubular ring 111 may be a round cylindrical shape or a polygon cylindrical shape depending on the number and the shape of one or more side panels 110. For example, FIG.

1A illustrates an example in which tubular ring 111 has a polygon cylindrical shape. This tubular ring 111 is formed by multiple (sixteen in FIG. 1A) planar side panels 110. In this example, both first edge 112 and second edge 114 are polygons.

On the other hand, FIG. 2A illustrates an example of toroidal support structure 100' in which tubular ring 111' has a round cylindrical shape and is formed by one continuous side panel 110' shaped into a complete cylinder. In this example, both first edge 112' and second edge 114' are circles. It should be noted that the round cylindrical shape may also be formed by multiple curved side panel 110' having the same radius.

In some embodiments, tubular ring 111' may have a frustum shape (e.g., a partial cone or a partial pyramid). In these embodiments, all side panels 110' may have the same angle relative to center axis 102'. Furthermore, first edge 112' has a different size than second edge 114', even though the shape of both edges 112' and 114' may be the same. For example, first edge 112' may be greater in size than second edge 114'. Alternatively, first edge 112' may be smaller in size than second edge 114'.

In some embodiments, one or more side panels 110 comprise grid stiffeners 115 or, more specifically, orthogrid stiffeners or isogrid stiffeners (e.g., triangularly arranged isogrid stiffeners). Grid stiffeners 115 enhance rigidity while saving material and therefore mass.

In some embodiments, one or more side panels 110 comprise openings 118. Openings 118 may be used for routing wires and/or piping and attaching other components. Furthermore, openings 118 may be used for ventilation of the space within and around toroidal support structure 100.

Toroidal support structure 100 also comprises one or more floor panels 120 forming planar ring 121. Planar ring 121 extends between outer edge 122 and inner edge 124. First edge 112 of one or more side panels 110 is fixed to outer edge 122 of one or more floor panels 120. As such, first edge 112 and outer edge 122 may have the same shape and size. For example, both first edge 112 and outer edge 122 may be polygons as shown in FIG. 1A or both first edge 112' and outer edge 122' may be circles as shown in FIG. 2A.

One or more floor panels 120 may be formed from various materials, such as metal, plastic, composites. In some embodiments, one or more floor panels 120 have a honeycomb sandwich structure, which is lightweight yet have high strength. One or more floor panels 120 may have openings 125 for accessing space around these panels.

Toroidal support structure 100 also comprises a plurality of isolating linear support components 130. Isolating linear support components 130 may be connected to second edge 114 of one or more side panels 110 at connection members 116. These connection members 116 may be evenly distributed along second edge 114 or, more specifically, along the perimeter of second edge 114. In other words, connection members 116 may be equally spaced from each other. Furthermore, each of connection members 116 may be equally spaced from center axis 102 of toroidal support structure 100. The spacing between each of connection members 116 and center axis 102 may be defined by radius 117. It should be noted that this spacing applies to all shape examples of second edge 114, which may be circular or have a polygon shape.

Isolating linear support components 130 are used for attaching toroidal support structure 100 to various mounting bases, one examples of which is a cryogenic tank. Specifically, isolated linear supports 130 allow for these mounting bases to undergo major temperature changes (e.g., changes of 100-300° C.) without substantial mechanical and thermal impact on toroidal support structure 100. Temperature changes typically cause dimensional changes due to coefficients of thermal expansion of various materials used for toroidal support structure 100. As such, the mounting bases and even isolated linear supports 130 may experience dimensional changes during temperature variations. However, the location of connections points 116 of isolated linear supports 130, the design and orientation of isolated linear supports 130, and other characteristics are specifically selected such that the dimensional changes of the mounting bases and of isolated linear supports 130 do not cause additional mechanical stresses or distortions on other components of toroidal support structure 100, such as one or more side panels 110 and one or more floor panels 120.

In some embodiments, multiple isolating linear support components 130 may be connected to second edge 114 at each connection member 116. Specifically, FIG. 1A illustrates two isolating linear support components 130 connected to each connection member 116. As such, when toroidal support structure 100 is installed (e.g., when toroidal support structure 100 is a part of an assembly as further described below with reference to FIG. 3), angle 131 between each of the two isolating linear support components 130 and second edge 114 may be less than 90°, such as between 45° and 60°. This feature may be used to provide circumferential support to the one or more side panels 110 and prevent toroidal support structure 100 from rotating around center axis 102. Furthermore, when toroidal support structure 100 is installed, angle 133 between the two isolating linear support components 130 connected to each connection member 116 may be between about 15° and 90° or, more specifically, between 30° and 45°.

Figure 1B:
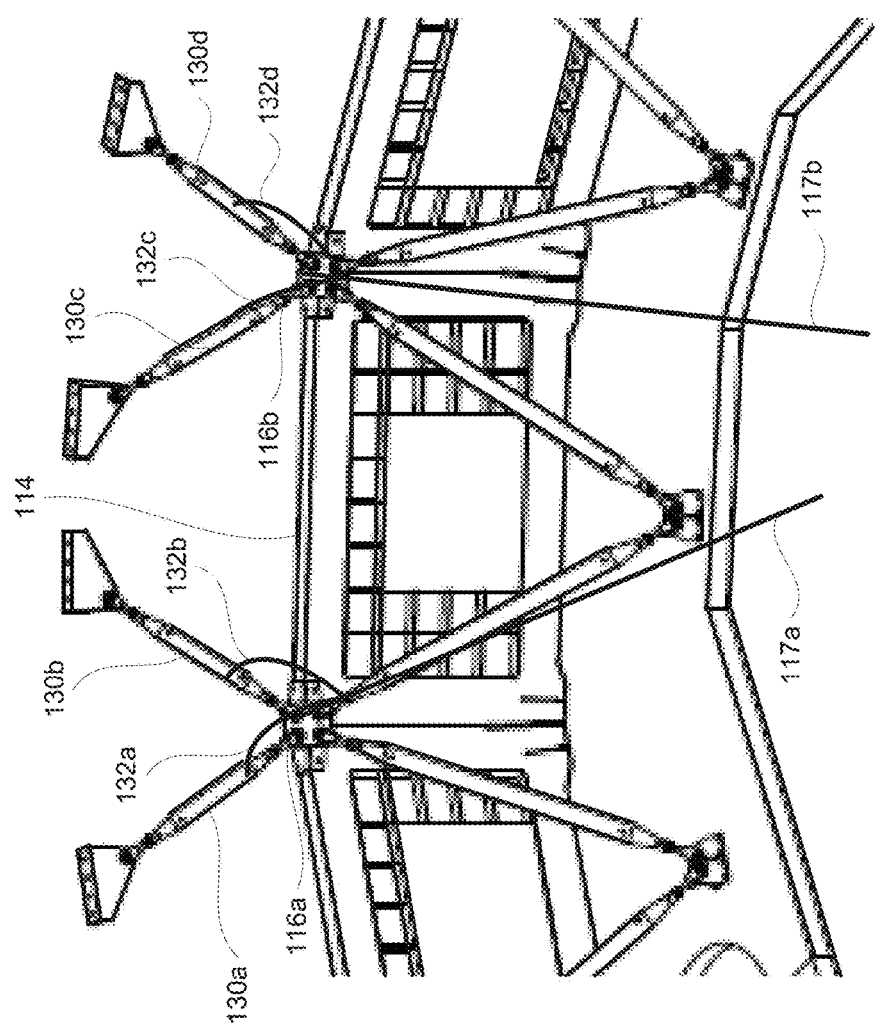
FIG. 1B is a schematic perspective view of a portion of the toroidal support structure of FIG. 1B showing one orientation example of isolating linear support components.

After installation, angle 132 between each isolating linear support component 130 and radius 117 (extending to corresponding connection member 116) may be the same. FIG. 1B illustrates a portion of toroidal support structure 100 showing two connection members 116a and 116b. Two isolating linear support components 130a and 130b are connected to connection member 116a, while two other isolating linear support components 130c and 130d are connected to connection member 116b. Radius 117a extends to connection member 116a, while radius 117b extends to connection member 116b. In this figures, angle 132.a (between isolating linear support components 130a and radius 117a) is the same as angle 132b (between isolating linear support components 130b and radius 117b) and, also, the same as each of angle 132c (between isolating linear support components 130c and radius 117c) and angle 132d (between isolating linear support components 130d and radius 117d). In other words, all four angles 132a-132d may be the same after installation of toroidal support structure 100 and fixing the orientations of isolating linear support components 130a-130d. This feature may be used to ensure that the same expansion or contraction of isolating linear support components 130a-130d does not cause tilting of second edge 114 or stress at connection members 116a and 116b.

Figure 1C:
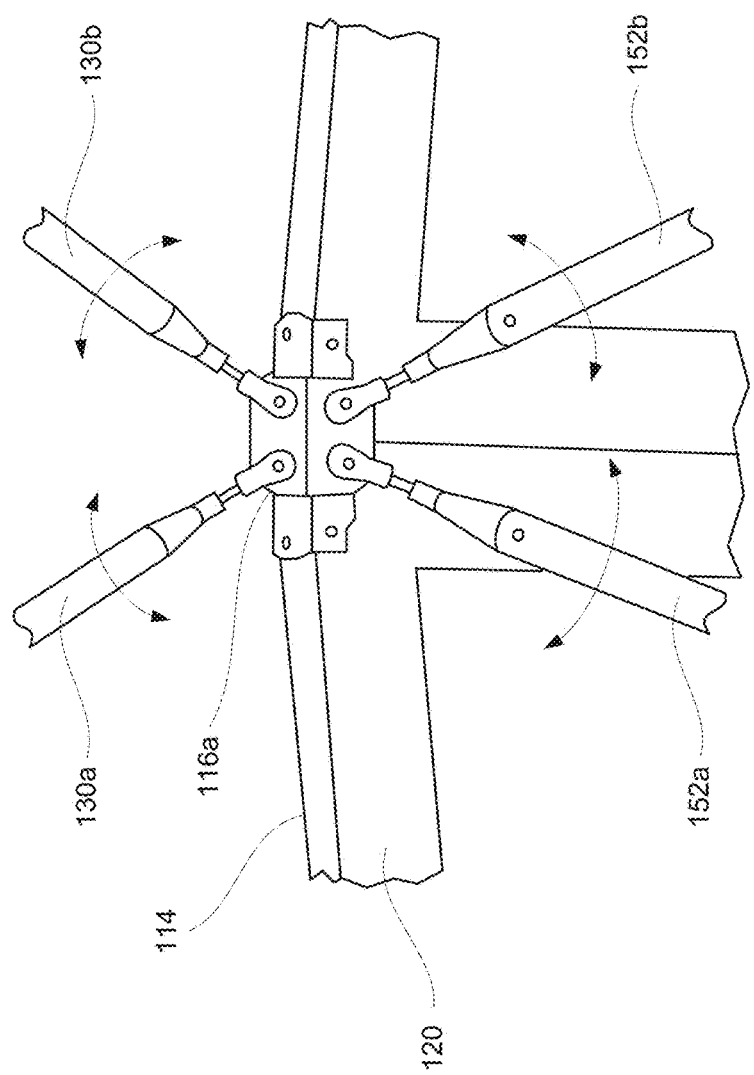
FIG. 1C is a schematic view of a connection member, illustrating isolating linear support components and struts pivotably connected to the connection member.

In some embodiments, each isolating linear support component 130 is pivotably connected to second edge 114 at one of connection members 116 as, for example, is shown in FIG. 1C. Specifically, FIG. 1C illustrates isolating linear support components 130a and 130b and struts 152.a and 152b, pivotably connected to connection member 116a. The pivotable connection may assist with installation of toroidal support structure 100, such as individually aligning isolating linear support components 130 relative to a mounting. Furthermore, in some embodiments, the pivotable connection allows to avoid transferring torque between isolating linear support components 130 and one or more side panels 110 and prevent bending of isolating linear support components 130 and one or more side panels 110.

Furthermore, in some embodiments, the length of each isolating linear support component 130 is the same as any other isolating linear support component 130. This feature may be used to ensure that second edge 114 is maintained parallel to a mounting base.

In some embodiments, toroidal support structure 100 further comprises plurality of connectors 140 for connecting toroidal support structure 100 to a mounting base, such as a cryogenic tank. Specifically, each isolating linear support component 130 may include one connector 140 attached to the end of isolating linear support component 130 that is opposite to the end connected to second edge 114 of one or more side panels 110. In some embodiments, one connector 140 may have multiple isolating linear support components 130 connected to. In some embodiments, connector 140 may be pivotably connected to corresponding isolating linear support components 130.

When multiple side panels 110 form tubular ring 111, these side panels 110 may be interconnected along vertical edges 113. Connection members 116 may be positioned at the ends of these vertical edges 113 or, more specifically, at intersections of vertical edges 113 and second edge 114. This approach allows for each connection member 116 to support two adjacent ones of side panels 110. As such, each connection member 116 may be positioned at a different interface formed by a pair of adjacent side panels 110a.

In some embodiments, toroidal support structure 100 further comprises one or more interior supports 150 connected to one or more side panels 110 and to one or more floor panels 120. One or more interior supports 150 may be used for maintaining orientation of one or more side panels 110 relative to one or more floor panels 120. More specifically, a combination of one or more interior supports 150, one or more side panels 110, and one or more floor panels 120 for a closed structure that enhances rigidity and other mechanical characteristics of toroidal support structure 100. It should be noted that one or more interior supports 150, one or more side panels 110, and/or one or more floor panels 120 do not have to be continuous structure around center axis 102. For example, one or more interior supports 150 may be multiple individual struts 152. Likewise, one or more side panels 110 and one or more floor panels 120 may have opening and other features. The continuity of the toroid cross-section is viewed as an aggregate over the entire revolution of this toroid. Specifically, the angle between one or more side panels 110 and one or more floor panels 120 along second edge 114 may be maintained by interior supports 150 even when various loads are applied to one or more side panels 110 and one or more floor panels 120.

In some embodiments, one or more interior supports 150 comprise plurality of struts 152 as, for example, shown in FIG. 1A. Struts 152 are very light that also provide more access to surfaces of one or more side panels 110 and one or more floor panels 120. Struts 152 may be connected to second edge 114 at connection members 116. In some embodiments, struts 152 may be even directly connected to isolating linear support components 130 such that at least part of the load between struts 152 and isolating linear support components 130 may be transferred directly rather than through one or more side panels 110. Furthermore, multiple struts 152 or, more specifically, two struts 152 may be connected to each connection member 116. In some embodiments, the connection between second edge 114 and struts 152 at connection members 116 may be pivotable.

Figure 2B:
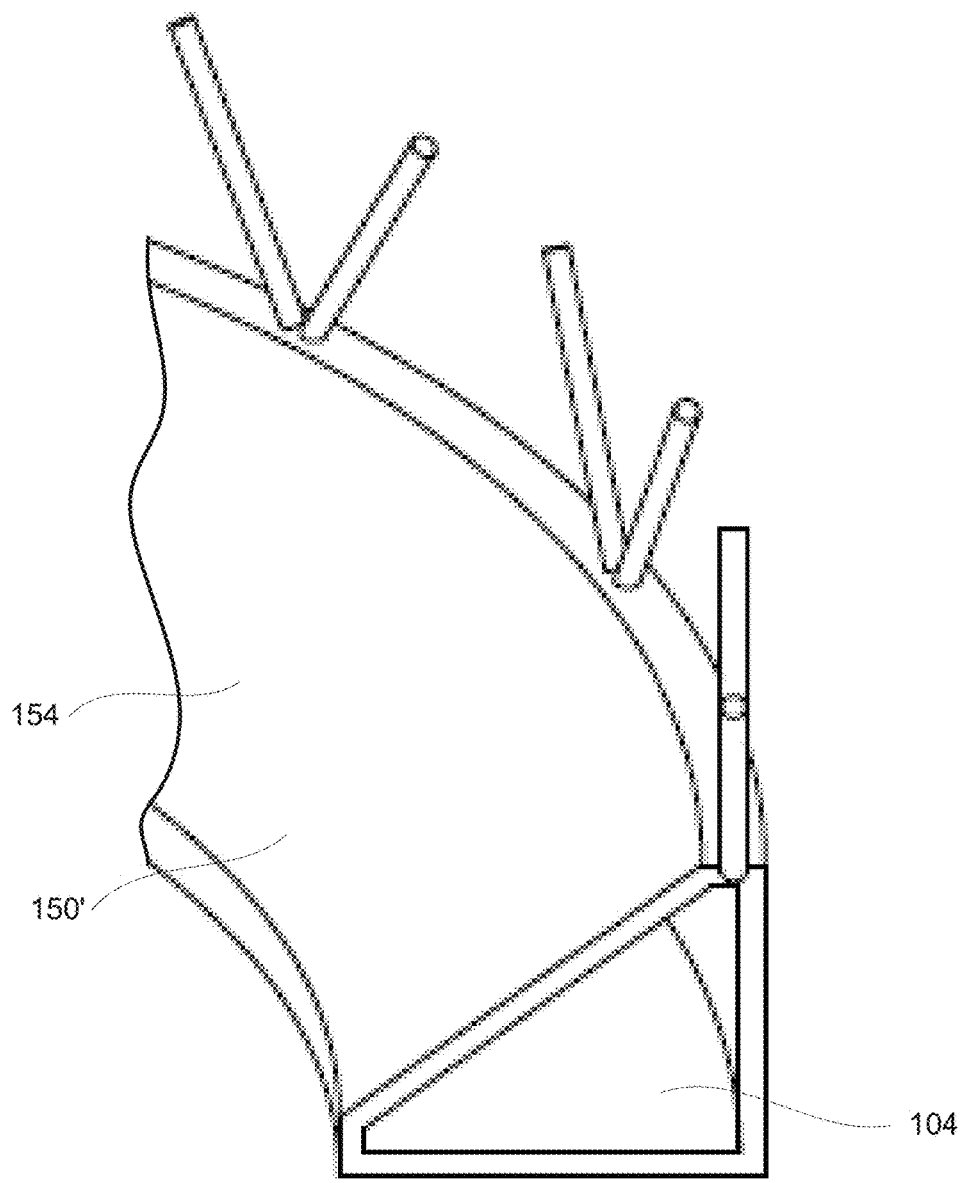
FIG. 2B is a schematic cross-sectional view of a portion of the toroidal support structure of FIG. 2B showing an enclosure, in accordance with some embodiments.

In some embodiments, one or more interior supports 150' may be interior panels 154 forming enclosure 104 together with one or more side panels 110 and one or more floor panels 120 as, for example, schematically shown in FIG. 2B. For example, multiple interior panels 154 or one continuous interior panel 154 as, for example, schematically shown in FIG. 2B, may be used. Enclosure 104 may be used to protect various components supported by toroidal support structure 100 from the environment. When toroidal support structure 100 has enclosure 104 either a portion of one or more side panels 110, a portion of one or more floor panels 120, or a portion of one or more interior panels 154 may removable or pivotable to access enclosure 104.

Examples of Assemblies Comprising Toroidal Support Structures

Figure 3:
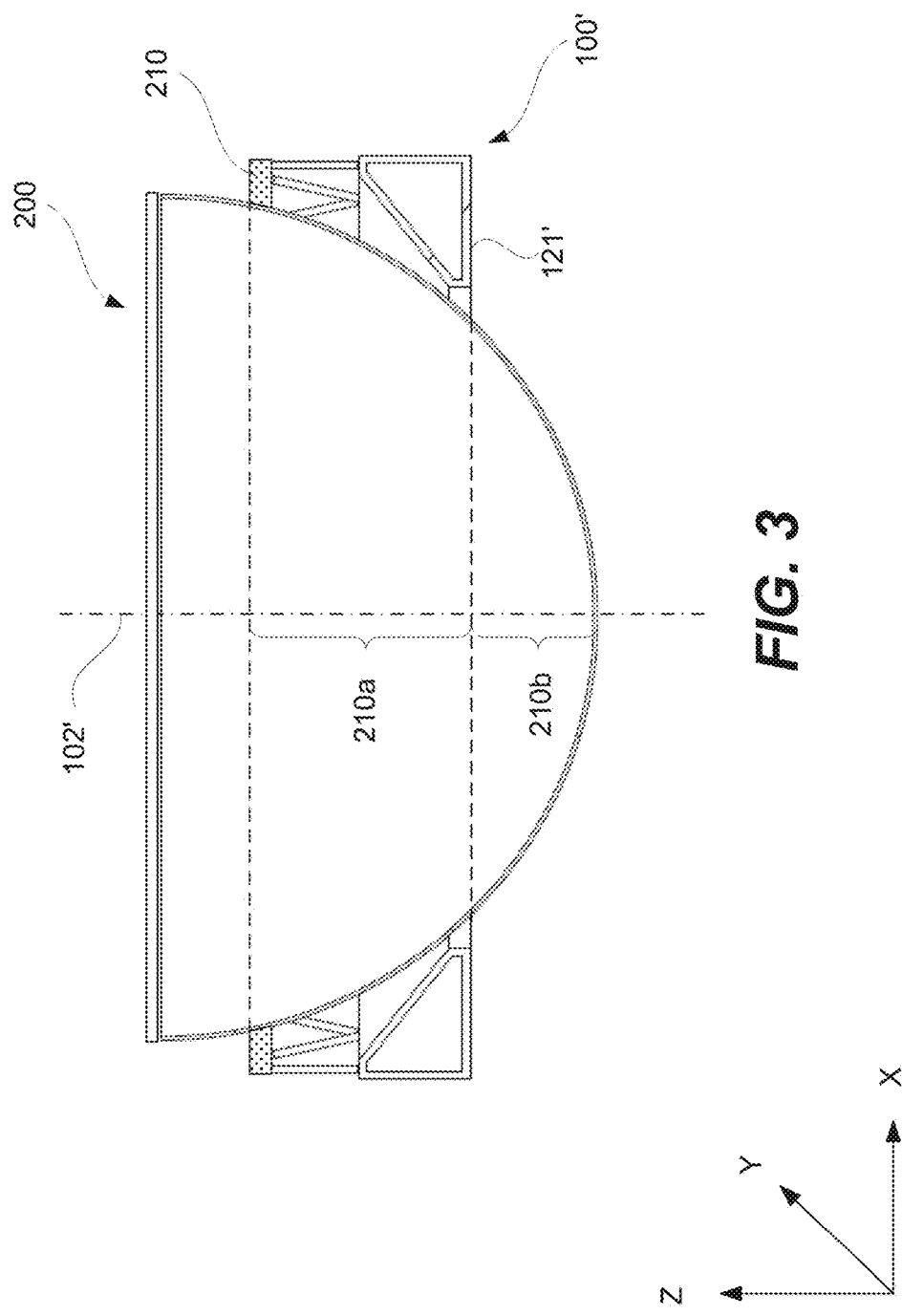
FIG. 3 is a schematic side view of the toroidal support structures ached to a cryogenic tank of a spacecraft, in accordance with some embodiments.

FIG. 3 is a schematic illustration of assembly 200 comprising toroidal support structure 100 and mounting base 210, in accordance with some embodiments. Various aspects and features of toroidal support structure 100 are described above with reference to FIGS. 1A-2B. In assembly 200, isolating linear support components 130 are connected to mounting base 210 providing support to toroidal support structure 100 relative to mounting base 210. It should be noted that depending on applications of toroidal support structure 100, the support may be in various linear and rotational directions. For example, static terrestrial applications may be predominantly associated with gravity. Other applications may also involve shocks and vibrations (momentum).

When toroidal support structure 100 is a part of assembly 200, its isolating linear support components 130 are attached on both ends and may maintain their orientation relative to other components of toroidal support structure 100. Various orientation examples are described above, e.g., with reference to FIG. 1B.

Mounting base 210 may be a cryogenic tank having a dome shape as, for example, shown in FIG. 3. Toroidal support structure 100 may surround mounting base 210 such that mounting base 210 at least partially protrudes into center opening 101. It should be noted that the size (and even the shape) of center opening 101 may vary at different height positions of toroidal support structure 100 depending on the cross-sectional shape of the torpid. For example, center opening 101 at the level of second edge 114 may be larger than center opening 101 at the level of first edge 112 allowing for spheres, cones, pyramids, and other non-cylindrical objects to more efficiently fit within center opening 101. In fact, center opening 101 may be specifically configured to fit around the object protruding through it. FIG. 3 illustrate portion 210a of mounting base 210 extending within the boundary of toroidal support structure 100' while portion 210b extends below this boundary. As such, in some embodiments, mounting base 210 protrudes through planar ring 121'.

Figure 4:
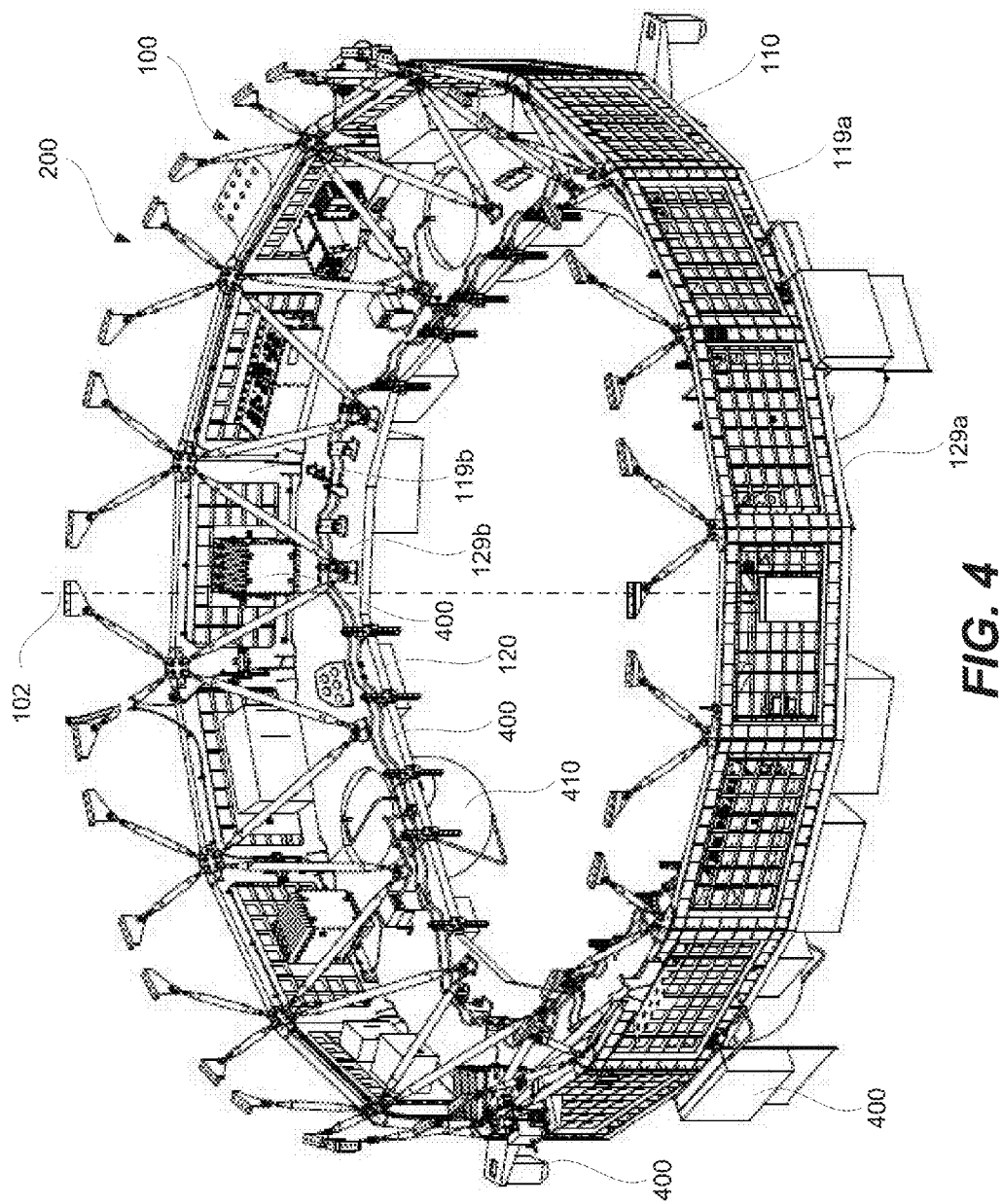
FIG. 4 is a schematic perspective view of the toroidal support structure of FIG. 1A illustrating various equipment attached to and supported by the toroidal support structure, in accordance with some embodiments.

FIG. 4 illustrates toroidal support structure 100 supporting various equipment 400, in accordance with some embodiments. Some examples of equipment 400 include wiring, tubing, cameras, thrusters. Equipment may be supported externally relative to toroidal support structure 100 or internally. Specifically, one or more side panels 110 have external surface 119a facing away from center axis 102 and internal surface 119b facing center axis 102. Likewise, one or more floor panels 120 have external surface 129a facing away from isolating linear support components 130 and internal surface 129b facing isolating linear support components 130. Equipment 400 may be mounted on one or more of these surfaces.

FIG. 4 also illustrates access panel 410 for maintenance or replacement of internally mounted equipment 400. Access panel 410 may be positioned within one or more floor panels 120 (as shown in FIG. 4), one or more side panels 110, and/or one or more interior panels 154. Access panel 410 may be pivotable relative to other panels.

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A toroidal support structure comprising:
   one or more side panels, comprising a first edge and a second edge and forming a tubular ring extending between the first edge and the second edge, wherein the second edge comprises connection members;
   a floor panel, comprising an outer edge and an inner edge and forming a planar ring extending between the outer edge and the inner edge,
      wherein the first edge of the one or more side panels is fixed to the outer edge of the floor panel;
   a plurality of isolating linear support components, where multiple ones of the plurality of isolating linear support components are connected to each one of the connection members,
      wherein the connection members are evenly distributed along the second edge and equally spaced from a center axis of the toroidal support structure by a radius; and
   a plurality of struts, connected to the floor panel and to the one or more side panels, such that multiple ones of the plurality of struts are connected to each one of the connection members.

2. The toroidal support structure of claim 1, wherein an angle between each one of the plurality of isolating linear support components and a radius extending to a corresponding one of the connection members associated with the one of the plurality of isolating linear support components has a same value.

3. The toroidal support structure of claim 1, wherein each of the plurality of isolating linear support components is pivotably connected to the second edge of the one or more side panels at one of the connection members.

4. The toroidal support structure of claim 1, further comprising a plurality of connectors for connecting the toroidal support structure to a cryogenic tank, wherein each of the plurality of connectors is connected to a different one of the plurality of isolating linear support components.

5. The toroidal support structure of claim 1, wherein a length of each of the plurality of isolating linear support components has a same value.

6. The toroidal support structure of claim 1, wherein each of the connection members is positioned at an interface formed by a pair of the one or more side panels.

7. The toroidal support structure of claim 1, wherein the one or more side panels comprises multiple side panels, each being a planar structure.

8. The toroidal support structure of claim 1, wherein the one or more side panels is a single cylindrical panel.

9. The toroidal support structure of claim 1, wherein the one or more side panels comprise grid stiffeners.

10. The toroidal support stricture of claim 1, wherein the plurality of struts is pivotably connected to the second edge of the one or more side panels at the connection members.

11. The toroidal support structure of claim 1, wherein the inner edge of the planar ring has a polygon shape.

12. An assembly comprising:
   a toroidal support structure comprising one or more side panels, a floor panel, a plurality of isolating linear support components, and a plurality of struts wherein:
      the one or more side panels comprise a first edge and a second edge and form a tubular ring extending between the first edge and the second edge,
      the second edge comprises connection members,
      the floor panel comprises an outer edge and an inner edge and forms a planar ring extending between the outer edge and the inner edge,
      the first edge of the one or more side panels is fixed to the outer edge of the floor panel,
      the plurality of isolating linear support components is connected to the connection members,
      the connection members are evenly distributed along the second edge and equally spaced from a center axis of the toroidal support structure by a radius,
      the plurality of struts is connected to the floor panel,
      multiple ones of the plurality of struts are pivotably connected to each of the connection members; and
   a mounting base,
      wherein the plurality of isolating linear support components is connected to the mounting base.

13. The assembly of claim 12, wherein the mounting base is a cryogenic tank having a dome shape, and wherein the toroidal support structure surrounds the mounting base such that a portion of the mounting base at least partially protrudes into the tubular ring.

14. The assembly of claim 12, wherein a portion of the mounting base at least partially protrudes into the planar ring.

15. The assembly of claim 12, further comprises at least one of wiring or tubing supported by the floor panel.

16. A toroidal support structure comprising:
   one or more side panels, comprising a first edge and a second edge and forming a tubular ring extending between the first edge and the second edge, wherein the second edge comprises connection members;
a floor panel, comprising an outer edge and an inner edge and forming a planar ring extending between the outer edge and the inner edge,
wherein the first edge of the one or more side panels is fixed to the outer edge of the floor panel;
a plurality of isolating linear support components connected to the connection members,
wherein the connection members are evenly distributed along the second edge and equally spaced from a center axis of the toroidal support structure by a radius; and
a plurality of struts, connected to the floor panel and pivotably, connected to the connection members.

* * * * *